United States Patent
Hagiuda (10) Patent No.: US 9,167,118 B2
(45) Date of Patent: Oct. 20, 2015

(54) DEVICE MANAGEMENT APPARATUS AND DEVICE MANAGEMENT METHOD

(71) Applicant: CANON KABUSHIKI KAISHA, Tokyo (JP)

(72) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/952,803

(22) Filed: Jul. 29, 2013

(65) Prior Publication Data

US 2014/0043633 A1   Feb. 13, 2014

(30) Foreign Application Priority Data

Aug. 8, 2012  (JP) .................................. 2012-176376

(51) Int. Cl.
*G06F 3/12* (2006.01)
*H04N 1/00* (2006.01)
*G06K 15/00* (2006.01)

(52) U.S. Cl.
CPC .......... *H04N 1/00973* (2013.01); *G06F 3/1204* (2013.01); *G06F 3/1229* (2013.01); *G06F 3/1288* (2013.01); *G06F 3/1293* (2013.01); *H04N 1/00344* (2013.01)

(58) Field of Classification Search
CPC . G06F 3/1293; G06F 3/1229; H04N 1/00973; H04L 12/4641; H04L 29/1249; H04L 63/0281
See application file for complete search history.

(56) References Cited

U.S. PATENT DOCUMENTS

2005/0105132 A1* 5/2005 Hagiuda ....................... 358/1.15
2012/0185563 A1* 7/2012 Sugiyama et al. ............ 709/217

FOREIGN PATENT DOCUMENTS

JP   2005-174303   6/2005

\* cited by examiner

*Primary Examiner* — Nicholas Pachol
*Assistant Examiner* — Henok A Shiferaw
(74) *Attorney, Agent, or Firm* — Fitzpatrick, Cella, Harper & Scinto (57) ABSTRACT

A device management apparatus determines whether or not each device connected to the device management apparatus has a device management page for managing the device and a remote operation function for remotely operating the device, and stores the result of the determination. The device management apparatus searches for the devices and creates a device list page. If any of the found devices has a device management page, reference information for referencing the device management page of the device is embedded into the device list page. Further, if any of the found devices has a remote operation function, trigger information for triggering the remote operation function is embedded into the device list page.

8 Claims, 12 Drawing Sheets

| 501 | 502 | 503 | 504 | 505 | 506 | 507 | 508 |
|---|---|---|---|---|---|---|---|
| DEVICE ID | DEVICE NAME | PRODUCT NAME | IP ADDRESS | STATE INFORMATION | HTTP PORT | VNC PORT | VNC STATUS |
| AAAAAAA | Device1 | MFP1000 | 172.24.128.1 | SERVICE CALL | OPEN | OPEN | OPERATING |
| BBBBBBB | Device2 | MFP2000 | 172.24.128.2 | JAM | OPEN | CLOSE | STOPPED |
| CCCCCCC | Device3 | MFP3000 | 172.24.128.3 | SERVICE CALL | OPEN | OPEN | OPERATING |
| DDDDDDD | Device4 | Printer01 | 172.24.128.4 | OUT OF PAPER | OPEN | CLOSE | NOT COMPATIBLE |
| EEEEEEE | Device5 | Printer02 | 172.24.128.5 | READY FOR PRINTING | CLOSE | CLOSE | NOT COMPATIBLE |
| ... | ... | ... | ... | ... | ... | ... | ... |

600a — DEVICE LIST
ALL DEVICE
EXECUTE REMOTE OPERATION — 601a
DISPLAY DEVICE MANAGEMENT PAGE — 602a

| | DEVICE NAME | PRODUCT NAME | IPv4 ADDRESS | INSTALLATION PLACE | UPDATE DATE |
|---|---|---|---|---|---|
| ◎ | Device1 | MFP1000 | 172.24.128.1 | Office001 MAP | 2012/04/04 12:57:39 |
| ● | Device2 | MFP2000 | 172.24.128.2 | Office002 | 2012/04/12 12:24:37 |
| ◎ | Device3 | MFP3000 | 172.24.128.3 | Office001 MAP | 2012/04/23 10:57:04 |
| ◎ | Device4 | Printer01 | 172.24.128.4 | Office001 MAP | 2012/04/23 10:58:37 |
| ◎ | Device5 | Printer02 | 172.24.128.5 | Office002 | 2012/04/23 10:59:22 |

600b — DEVICE LIST
ALL DEVICE
EXECUTE REMOTE OPERATION — 601b
DISPLAY DEVICE MANAGEMENT PAGE — 602b

| | DEVICE NAME | PRODUCT NAME | IPv4 ADDRESS | INSTALLATION PLACE | UPDATE DATE |
|---|---|---|---|---|---|
| ◎ | Device1 | MFP1000 | 172.24.128.1 | Office001 MAP | 2012/04/04 12:57:39 |
| ◎ | Device2 | MFP2000 | 172.24.128.2 | Office002 | 2012/04/12 12:24:37 |
| ● | Device3 | MFP3000 | 172.24.128.3 | Office001 MAP | 2012/04/23 10:57:04 |
| ◎ | Device4 | Printer01 | 172.24.128.4 | Office001 MAP | 2012/04/23 10:58:37 |
| ◎ | Device5 | Printer02 | 172.24.128.5 | Office002 | 2012/04/23 10:59:22 |

| DEVICE LIST | | | | |
|---|---|---|---|---|
| ALL DEVICE | | | | |
| DEVICE NAME | PRODUCT NAME | IPv4 ADDRESS | DEVICE STATE | |
| Device1 | MFP1000 | 172.24.128.1 | ⊕ SERVICE CALL ERROR | EXECUTE REMOTE OPERATION |
| Device2 | MFP2000 | 172.24.128.2 | ⊗ JAM | DISPLAY DEVICE MANAGEMENT PAGE |
| Device3 | MFP3000 | 172.24.128.3 | ⊕ SERVICE CALL ERROR | EXECUTE REMOTE OPERATION |
| Device4 | Printer01 | 172.24.128.4 | ⊙ OUT OF PAPER | DISPLAY DEVICE MANAGEMENT PAGE |
| Device5 | Printer02 | 172.24.128.5 | READY FOR PRINTING | |

901 — DEVICE NAME
902 — PRODUCT NAME
903 — IPv4 ADDRESS
904 — DEVICE STATE
905, 906, 907, 908
900

| | | | | |
|---|---|---|---|---|
| 🖨 OA-Printer | | | | |
| STATE | INFORMATION | INSTALLATION | NETWORK | CLOSE ? |

INFORMATION

DEVICE STATE

| PRINTER | ○ READY FOR PRINTING |
|---|---|

PAPER FEED INFORMATION

| PAPER FEED TRAY | ⬢ SIZE UNKNOWN |
|---|---|
| ✓ CASSETTE 1 | ⬢ A4 |

TONER REMAINING AMOUNT

| BLACK | UNKNOWN ▭ | YELLOW | UNKNOWN ▭ |
|---|---|---|---|
| MAGENTA | UNKNOWN ▭ | CYAN | UNKNOWN ▭ |

INFORMATION

| DEVICE NAME | OA-Printer |
|---|---|
| INSTALLATION PLACE | 100914 |
| TONER CARTRIDGE MODEL NUMBER | Black toner cartridge for LBP5050(BLACK)<br>Yellow toner cartridge for LBP5050(YELLOW)<br>Magenta toner cartridge for LBP5050(MAGENTA)<br>Cyan toner cartridge for LBP5050(CYAN) |
| ADMINISTRATOR | root |

DEVICE MANAGEMENT APPARATUS AND DEVICE MANAGEMENT METHOD

BACKGROUND OF THE INVENTION

1. Field of the Invention

The present invention relates to a device management apparatus and a device management method that are for managing network devices connected to a network.

2. Description of the Related Art

A conventional multifunction device connectable to a network typically has a WWW server, functions to notify a user of the state of the device, the installation state of optional components, remaining amount of consumables (such as toner and paper), and the like, and provides a client with a web device management page that enables display and setting of various types of information. The user can check the information included in the web device management page from a client PC at a remote location via a browser, and can display and set the information as needed so as to manage the multifunction device.

Accordingly, a device management server (device management program) that manages the conventional devices connectable to a network generally has a function of providing links on a UI or the like that displays a list of found devices so as to move to the web device management pages of the devices (for example, Japanese Patent Laid-Open No. 2005-174303).

The above-described web device management pages in the conventional example need individual design and implementation according to the functions of the multifunction device. In order to avoid the cost, complications, and the like of individual implementation, typically, only general-purpose information among information that can be displayed by and set through an operation panel of the device are supported.

On the other hand, some recent multifunction devices have developed to include a remote desktop function. Remote desktop function refers to a function for allowing a user to remotely operate a graphical user interface (GUI) of the device. The remote desktop function is generally constituted by a server side application installed in a multifunction device that is to be operated and a client side application that is operated by the user. The server side application divides a screen of pixel data into small rectangles, designates position information thereof, and transmits the position information to the client side application, and the client side application transmits operations executed by the user to the server side application together with position information.

When comparing this remote desktop function with the web device management page, the former allows the user to remotely operate the GUI of the device so that often substantially all the information on the device can be displayed and set. However, since multifunction devices having the remote desktop function constitute only a small portion of commercially available products, a problem arises in that the device management program is not compatible with the remote desktop function, making it difficult to efficiently use the remote desktop function of the multifunction device.

SUMMARY OF THE INVENTION

The present invention was made in view of the above described conventional example, and provides a device management apparatus and a device management method that make a remote desktop function available from a device management program and improve the efficiency of operations such as referencing and changing device information.

In order to achieve the object, the present invention has the following configuration. That is, a device management apparatus that manages a network device connected to a network, comprises: a first determination unit configured to determine whether or not a first port of the network device is open, the first port being for accessing a web service provided by the network device; a second determination unit configured to determine whether or not a second port of the network device is open, the second port that being used in communication by an application for remotely operating the network device; and a control unit configured to enable a function for accessing the web service if it is determined that the first port is open, and to enable a function for remotely operating the network device if it is determined that the second port is open.

According to the present invention, when a found device provides a device management page, it is possible to embed reference information on the device management page into a device list page, and when the found device has a remote operation function, it is possible to embed means for starting the remote operation function. Accordingly, the device management page and the remote operation function of the device can efficiently be used.

Further features of the present invention will become apparent from the following description of exemplary embodiments with reference to the attached drawings.

DESCRIPTION OF THE EMBODIMENTS

Hereinafter, embodiments for implementing the present invention are described with reference to the drawings.

Embodiment 1

Hardware Configuration

Figure 1:
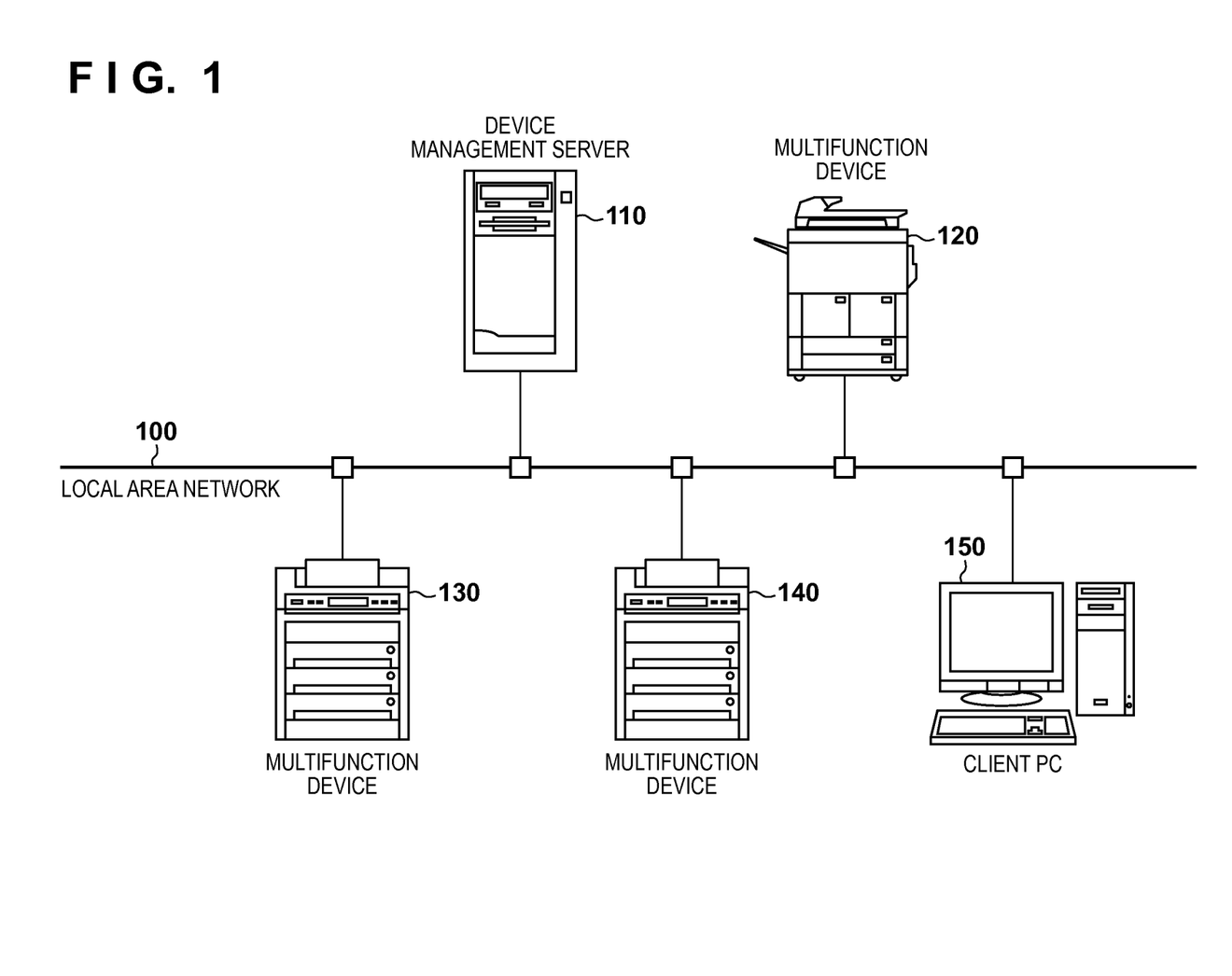
FIG. 1 is a diagram illustrating a system configuration of a device management system.

FIG. 1 is a diagram illustrating a configuration of a device management system in the present invention. In the figure, a device management server 110, a client PC (client terminal) 150, and multifunction devices 120, 130, and 140 as network devices are connected to a local area network 100.

The multifunction devices 120, 130, and 140 each provide more than one function such as print and scan functions, and each implement a web server function and a web device management page that is provided to a client by the web server function. Also, some of the multifunction devices implement a remote desktop function, in addition to or instead of the web device management page. In the example of FIG. 1, it is assumed that the multifunction devices 120 and 140 implement the remote desktop function. Note that the present invention is applicable not only to multifunction devices but also to network devices such as single-function peripherals, for example, a printer or a scanner.

In the device management server 110, a device management program is running and manages the multifunction devices 120, 130, and 140 by procedures that will be described later. On the other hand, it is assumed that the client PC 150 is used by an administrator of the multifunction devices 120, 130, and 140. Note that the device management program that runs in the device management server 110 of the present embodiment is a web program that runs on a WWW server, and is operated by the administrator via a web browser program of the client PC 150.

If any of the multifunction devices 120, 130, and 140 malfunctions, the device management program on the device management server 110 detects the malfunction using, for example, SNMP, and notifies the administrator of the malfunction with the use of means such as e-mail. The administrator who has been notified of the malfunction can operate the device management program via the web browser program to grasp an outline of the malfunction. Further, the administrator can also obtain detailed information on the malfunction with the use of the web device management page and the remote desktop function as needed.

Figure 2:
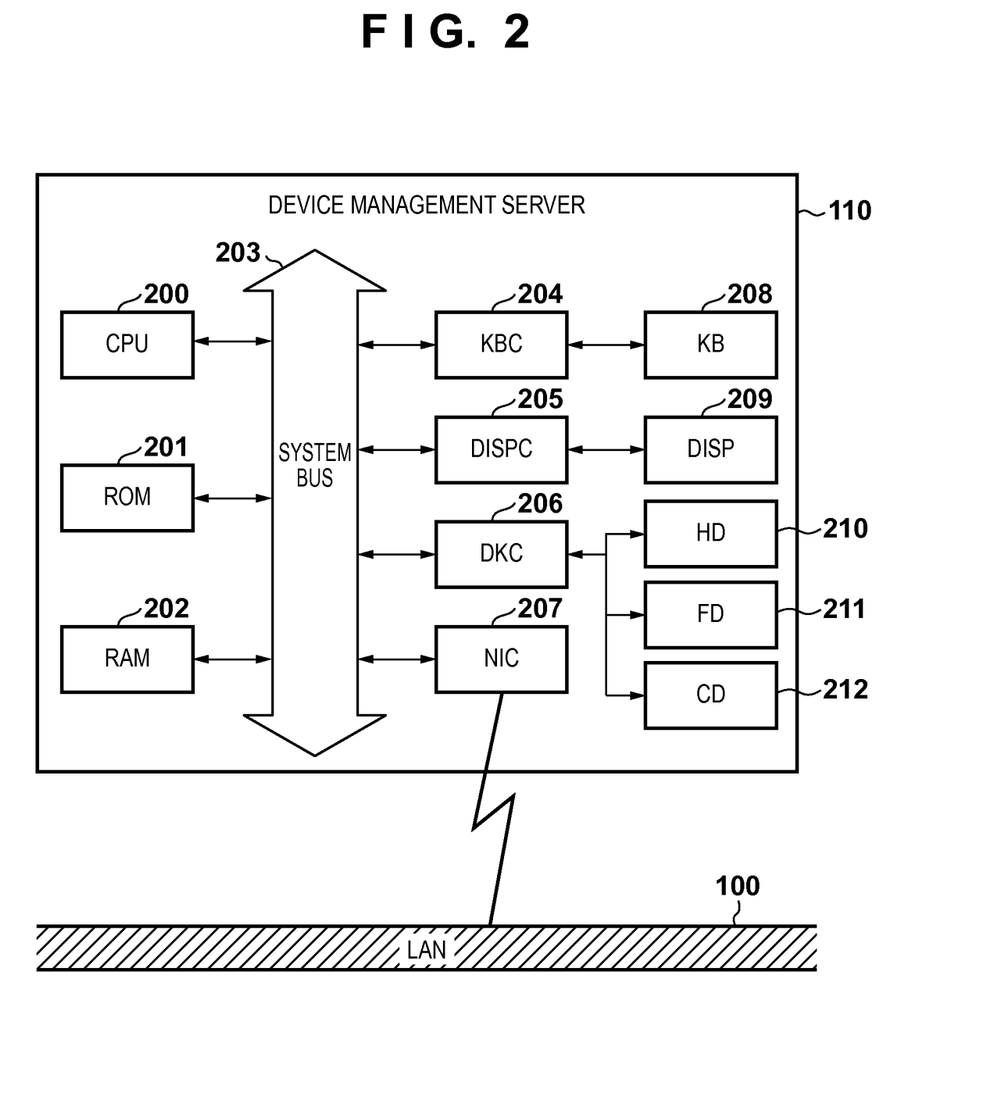
FIG. 2 is a block diagram illustrating a configuration of a device management server.

FIG. 2 is a block diagram illustrating a configuration of the device management server 110 to which the present embodiment is applied. Note that it is assumed that the device management server 110 is a general-purpose computer, and the client PC 150 has a similar configuration. In FIG. 2, the device management server 110 includes a CPU 200 that executes the device management program (a description thereof will be given later) that is stored in a ROM 201 or hard disk (HD) 210. The CPU 200 performs overall control of devices connected to a system bus 203. A RAM 202 serves as a main memory, a work area, or the like of the CPU 200. A keyboard controller (KBC) 204 controls instruction input from a keyboard (KB) 208, a pointing device (not shown), or the like. A display controller (DISPC) 205 controls display of a display (DISP) 209. A disk controller (DKC) 206 controls access to the hard disk (HD) 210, a floppy (registered trademark) disk controller (FD) 211, and a CD-ROM drive (CD) 212. A network interface card (NIC) 207 transmits and receives data bi-directionally to and from the client PC 150 and the multifunction devices 120, 130, and 140 via a LAN 100. Note that in the entire description below, unless otherwise noted, hardware of the device management server 110 is executed by the CPU 200, and software of the device management server 110 is controlled by the device management program stored in the hard disk (HD) 210. Also, the device management program may be supplied by being stored in a storage medium such as a CD-ROM, and in this case, the program is read out from the storage medium by the CD-ROM drive 212 or the like, and installed on the hard disk (HD) 210.

Figure 10:
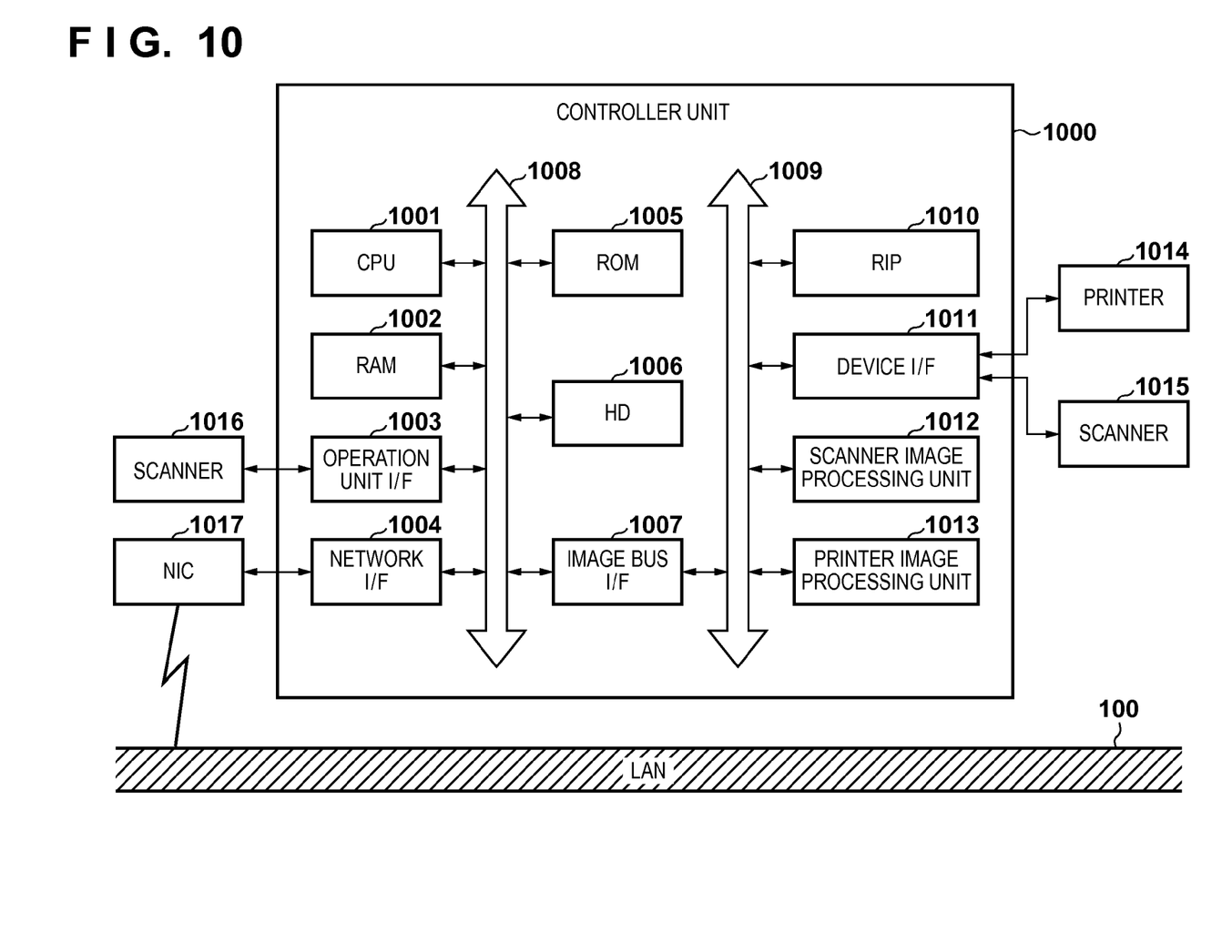
FIG. 10 is a block diagram illustrating a configuration of a control unit of the multifunction device.

FIG. 10 is a block diagram illustrating a configuration of a control unit 1000 in each of the multifunction devices 120, 130, and 140 according to the present embodiment. A CPU 1001 is a controller that controls the entire control unit 1000. A RAM 1002 is a system work memory that is used by the CPU 1001 for performing operations. The RAM 1002 also serves as an image memory for temporarily storing image data. A ROM 1005 is a boot ROM and stores a boot program of the system. An HD 1006 is a hard disk drive and stores system software and image data. It is assumed that the HD 1006 also stores remote operation server applications 324 and 344, WWW server programs 322, 332, and 342, and device management pages 323, 333, and 343 of the present embodiment.

An operation unit I/F 1003 serves as an interface with an operation unit 1016, and controls data that is to be output to an operation unit 1016 and data that is input by the user via the operation unit 1016. The operation unit 1016 is constituted by an unshown ten key, display, and the like, and functions to display data that is to be notified to the user and to transmit data input from the user to the CPU 1001 via the operation unit I/F 1003. Also, if the operation unit 1016 is a touch panel, the operation unit 1016 displays an operation screen. A network interface 1004 is connected to the LAN 100 via a network interface card (NIC) 1017, and communicates with the client PC 150 and the device management server 110. An image bus interface 1007 is a bus bridge that connects a system bus 1008 to an image bus 1009 that transfers image data with high speed, so as to convert the data structure. The image bus 1009 is configured by a PCI bus or an IEEE 1394 bus. A raster image processor (RIP) 1010 expands a PDL command transmitted from the network into a bitmap image. A device I/F unit 1011 connects a printer 1014 and a scanner 1015, which are image input and output devices, to the control unit 1000, and converts the image data synchronously or asynchronously. A scanner image processing unit 1012 performs correction, manipulation, and editing of input image data that is input via the scanner 1015. A printer image processing unit 1013 performs, according to the capability of the printer 1014, correction, resolution conversion, and the like of image data that is to be output.

Software Configuration

Figure 3:
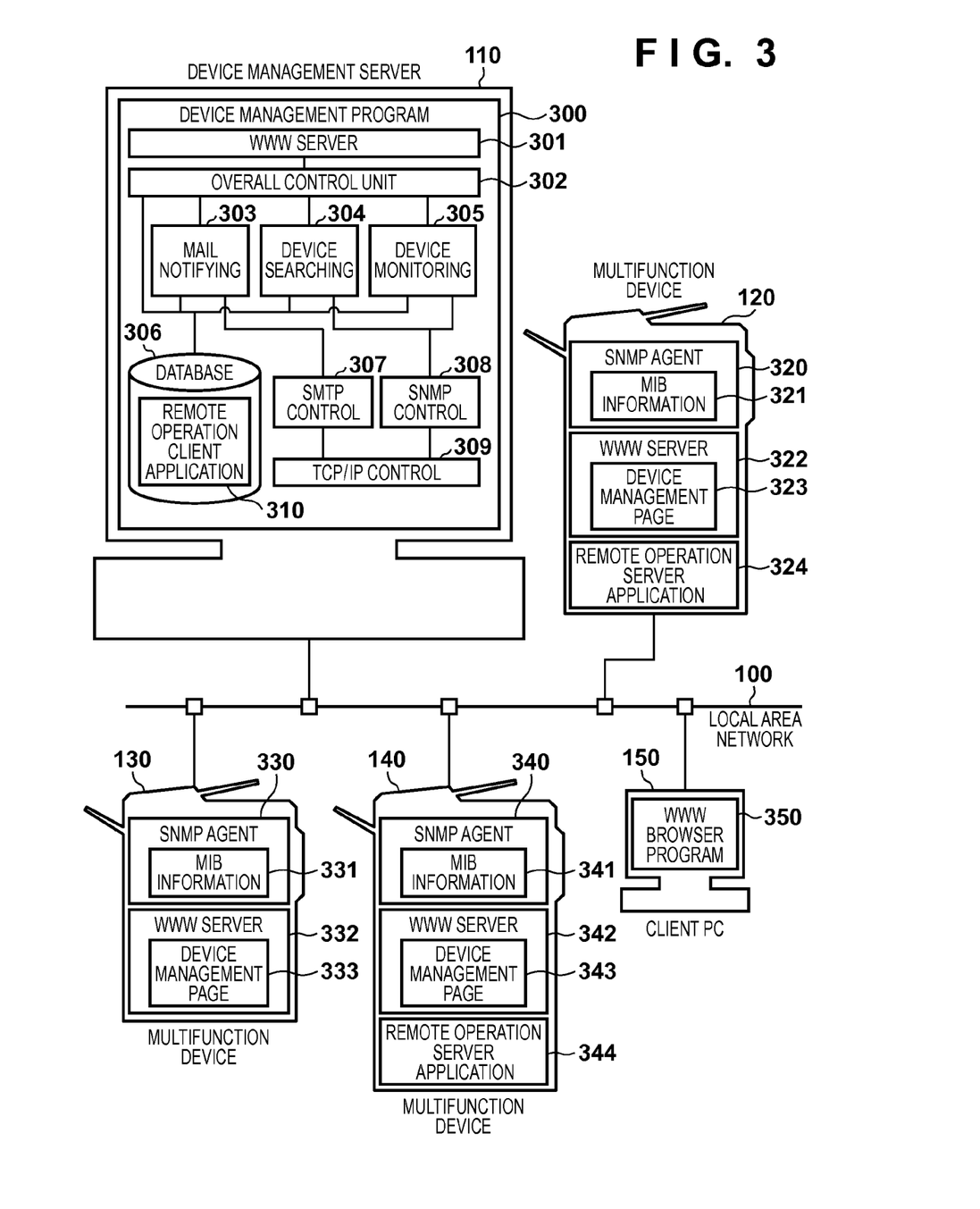
FIG. 3 is a diagram illustrating software configurations of the device management system.

FIG. 3 is a diagram illustrating software configurations of the devices that constitute the device management system in the present embodiment. In the present embodiment, it is assumed that a device management program 300 operates on a WWW server 301, and communicates with a WWW browser program 350 on the client PC 150 using an HTTP protocol. It is also assumed that the device management program 300 communicates with the multifunction devices 120, 130, and 140 using a simple network management protocol (SNMP) and another unique protocol.

Also, the device management program 300 that runs on the device management server 110 according to the present embodiment is stored in the hard disk (HD) 210 and executed by the CPU 200, unless otherwise noted.

In the device management program 300, the WWW server 301 operates on the device management server 110. The device management program 300 receives, via the WWW server 301, a HTML data transmission request from the web browser program 350 running on the client PC 150. The device management program 300 that has received the HTML data transmission request communicates with the multifunction devices 120, 130, and 140 using an SNMP protocol in order to generate HTML data.

Further, the device management program 300 generates the HTML data from the obtained information (for example, state information that indicates the states of the devices) relating to the multifunction devices 120, 130, and 140, and transmits the generated HTML data to the web browser program 350 running on the PC 150 via the WWW server 301.

An overall control unit 302 is a functional module for controlling a device searching unit 304 and a device monitoring unit 305 so as to communicate with the multifunction devices 120, 130, and 140 and to obtain and set information thereon, thereby generating HTML data. A mail notifying unit 303 is a functional module for notifying by e-mail, via a SMTP control unit 307, a preregistered administrator of information on malfunction of the found multifunction devices 120, 130, and 140 and of various types of information on the device management program 300. The device searching unit 304 is a functional module for searching for the multifunction devices 120, 130, and 140 to register necessary information into a database unit 306. More specifically, the device searching unit 304 functions to control an SNMP control unit 308 and to search for the multifunction devices 120, 130, and 140 on the network by a method using SNMP, such as unicast or broadcast. The device monitoring unit 305 is a functional module for obtaining state information on the multifunction devices 120, 130, and 140 by polling using SNMP via the SNMP control unit 308 at a preset cycle, so as to determine whether or not malfunction has occurred. The device monitoring unit 305 can further receive, via the SNMP control unit 308, trap messages from the multifunction devices 120, 130, and 140. Therefore, the device management program can detect possible changes in the states of the multifunction devices 120, 130, and 140 in real time.

The database unit 306 is a functional module for storing information on the malfunction of the multifunction devices 120, 130, and 140 that was detected by the device management program 300. The database unit 306 also stores a remote operation client application 310 for communicating with the remote operation server applications 324 and 344 that respectively run on the multifunction devices 120 and 140, so as to control the multifunction devices from a remote place. This remote operation client application 310 is installed into the client PC 150 using a technology such as ClickOnce (registered trademark), and thereby enables the administrator to remotely operate the multifunction device 120 and 140. The SMTP control unit 307 is a functional module for performing, in response to a request from the mail notifying unit 303, protocol control of a simple mail transfer protocol (SMTP) and for notifying by e-mail the administrator of various types of information including the malfunction information. The SNMP control unit 308 is a functional module for performing protocol control of SNMP. The SNMP control unit 308 is used for setting information on the management target multifunction devices 120, 130, and 140, and for obtaining management information such as the malfunction information from the multifunction devices 120, 130, and 140. A TCP/IP control unit 309 is a functional module for performing communication control using a TCP/IP protocol in response to requests from the SMTP control unit 307 and the SNMP control unit 308. SNMP agents 320, 330, and 340 respectively run on the multifunction devices 120, 130, and 140. The SNMP agents 320, 330, and 340 are programs that respond to SNMP requests transmitted from the device management program 300, which serves as an SNMP manager, with reference to MIB information units 321, 331, and 341. The SNMP agents 320, 330, and 340 also functions to actively notify the device management program 300 of the malfunction that has occurred on the multifunction devices 120, 130, and 140 using TRAP. The MIB information units 321, 331, and 341 are databases that hold various types of information on the multifunction devices 120, 130, and 140 in a management information base (MIB) format.

Further, the WWW server programs 322, 332, and 342 are running on the multifunction devices 120, 130, and 140, respectively. The WWW server programs 322, 332, and 342 receive HTML data transmission requests from the web browser program 350 that runs on the client PC 150. The WWW server programs 322, 332, and 342 that have received the HTML data transmission requests communicate with a controller module (not shown) and obtain the management information to generate HTML data of the device management pages 323, 333, and 343. Note that the device management pages 323, 333, and 343 provide the administrator with web services such as displaying of the state information and changing of settings of the network information, in order for the administrator to manage the corresponding multifunction devices 120, 130, and 140 via the web browser program 350 on the client PC 150. The remote operation server applications 324 and 344 communicate with the remote operation client application 310 that is to be installed into the client PC 150, and enable the multifunction devices 120, 130, and 140 to be operated remotely. Note that in the present embodiment, no remote operation server application runs on the multifunction device 130. This means that the network device management system according to the present embodiment supports management of a mixed environment of devices that are compatible with the remote operation server application and devices that are not compatible therewith.

Here, a difference between the device management pages 323, 333, and 343, and the remote operation server applications 324 and 344 will briefly be described. In the case of the device management pages 323, 333, and 343, data that is handled is input and output via the network interface 1004 of FIG. 10. Due to the cost of implementation of the device management page depending on the types of devices and the complexity at the time of changing the specifications, part of the information on the multifunction devices 120, 130, and 140 is generally publically released. Also, since the device management page is transmitted via HTTP, the device management page has a poor real-time response property, and does generally not support the remote operation of the device although the device management page can display information and be used for configuration of settings such as network settings that do not need to be configured in real-time.

On the other hand, in the case of the remote operation server applications 324 and 344, data that is handled is input and output by emulation of the operation unit interface 1003 in FIG. 10. In this case, the operation unit 1016 is virtually provided by the remote operation client application 350, and all controllable pieces of data can be input and output from the operation unit (operation panel) 1016. Therefore, substantially all the data included in the multifunction devices 120, 130, and 140 can be operated. Accordingly, when comparing the device management pages 323, 333, and 343 with the remote operation server applications 324 and 344, it can be said that the latter can treat wider range of and more detailed data.

Device Management Program Execution Procedures

Figure 4:
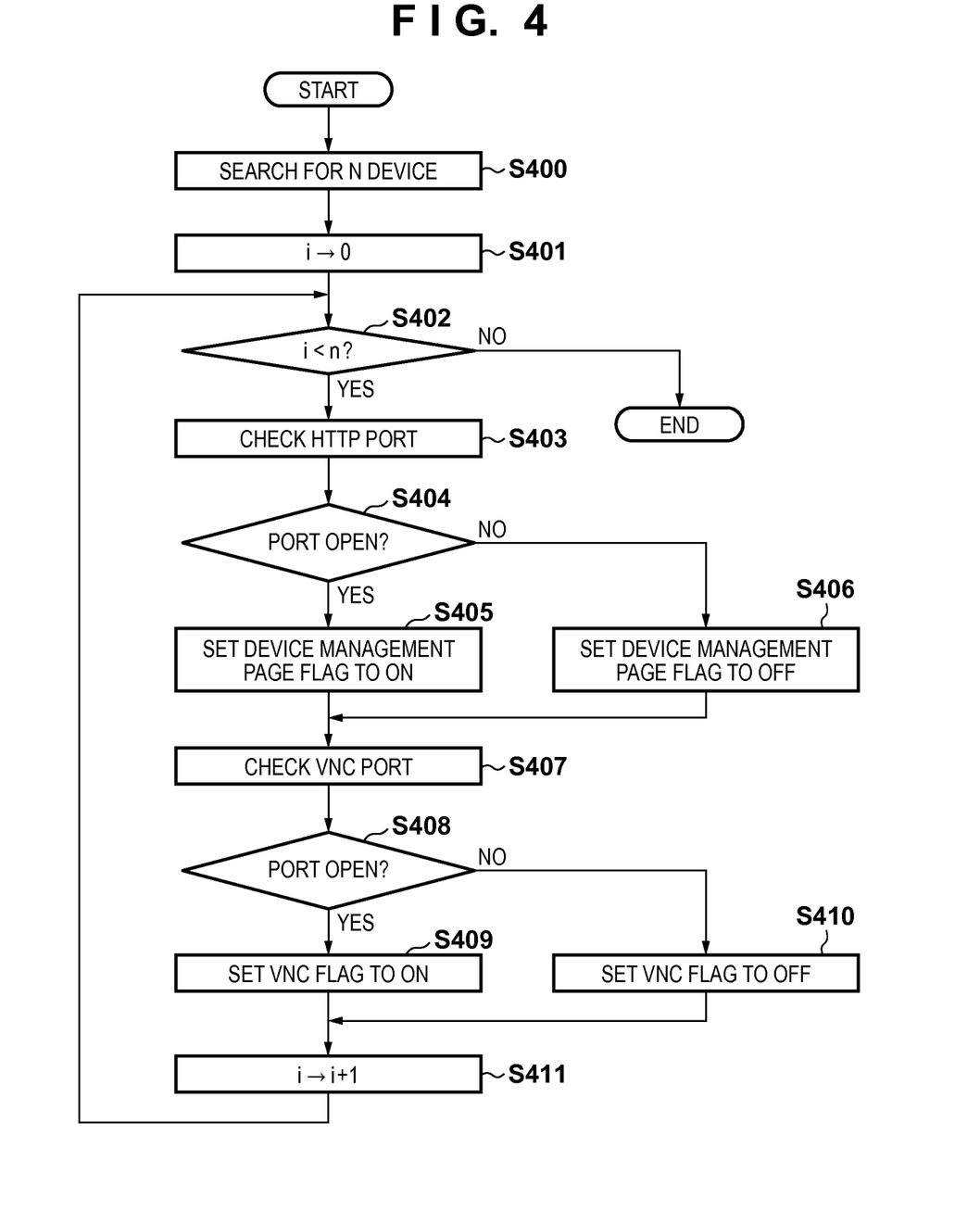
FIG. 4 is a flowchart illustrating operations performed when a device management program checks functions of a multifunction device.

FIG. 4 is a flowchart illustrating operations performed when the device management program 300 of the present embodiment checks the operational statuses of the web device management pages and the remote operation server applications of the management target multifunction devices. In the figure, in step S400, the device searching unit 304 starts processing for searching for the multifunction devices 120, 130, and 140 via the SNMP control unit 308 and the TCP/IP control unit 309 and detects n devices, and the procedure shifts to step S401. In step S401, the device management program 300 initializes an index i that is used for counting the number of the management target multifunction devices to 0, and the procedure shifts to step S402. In step S402, it is determined whether or not the value of the index i exceeds n, which is the sum total of the number of the found devices. If it is determined that the value of the index i does not exceed n, the procedure shifts to step S403, and otherwise the procedure ends.

In step S403, the state of the HTTP port of the i-th multifunction device is checked (i.e., referenced) in order to check the operational status of the web device management page thereof, and the procedure shifts to step S404. In this step, it is assumed that the state of the port is checked by, for example, transmitting a HEAD command to the TCP port 80, which is the default port number of HTTP, and determining whether or not connection can be established.

In step S404, as a result of the check in step S403, it is determined whether or not the HTTP port of the i-th device is open. In step S404, if it is determined that the HTTP port of the i-th device is open, the procedure shifts to step S405, and otherwise the procedure shifts to step S406. Note that the device management program 300 according to the present embodiment determines that the web device management page is working if the HTTP port of the multifunction device is open.

In step S405, as a result of the determination in step S404 showing that the HTTP port of the i-th multifunction device is open, a flag indicating the state of the HTTP port of the multifunction device in a later described database 600 is set to on, and the procedure shifts to step S407.

In step S406, as a result of the determination in step S404 showing that the HTTP port of the i-th multifunction device is closed, the flag indicating the state of the HTTP port of the multifunction device in the later described database 600 is set to off, and the procedure shifts to step S407.

In step S407, the state of the port that is to be used by the remote operation server application of the i-th multifunction device is checked (i.e., referenced), and the procedure shifts to step S408. Note that in the present embodiment, the remote operation server application is assumed to be a virtual network computing (VNC), and the remote operation client application is assumed to be a VNC viewer. Therefore, in step S408, it is assumed that the states of the TCP ports 5900 to 5906, which are communication ports generally used by VNC, are checked. If VNC uses other ports than the given number ports, those ports are, of course, checked.

In step S408, as a result of the check in step S407, it is determined whether or not the VNC port of the i-th device is open. If it is determined in step S408 that the VNC port of the i-th device is open, the procedure shifts to step S409, and otherwise the procedure shifts to step S410. In step S409, as a result of the determination in step S408 showing that the VNC port of the i-th multifunction device is open, a flag indicating the state of the VNC port of the multifunction device in the later described database 600 is set to on, and the procedure shifts to step S411. In step S410, as a result of the determination in step S408 showing that the VNC port of the i-th multifunction device is closed, the flag indicating the state of the VNC port of the multifunction device in the later described database 600 is set to off, and the procedure shifts to step S411.

In step S411, the device management program 300 increments the index i used for counting the number of the management target multifunction devices, and the procedure returns to step S402.

With the above described steps, the device management program 300 of the present embodiment checks the operational statuses of the web management pages and VNCs of the management target multifunction devices, and registers the necessary information in the later described database 600.

Device Information

Figure 5:
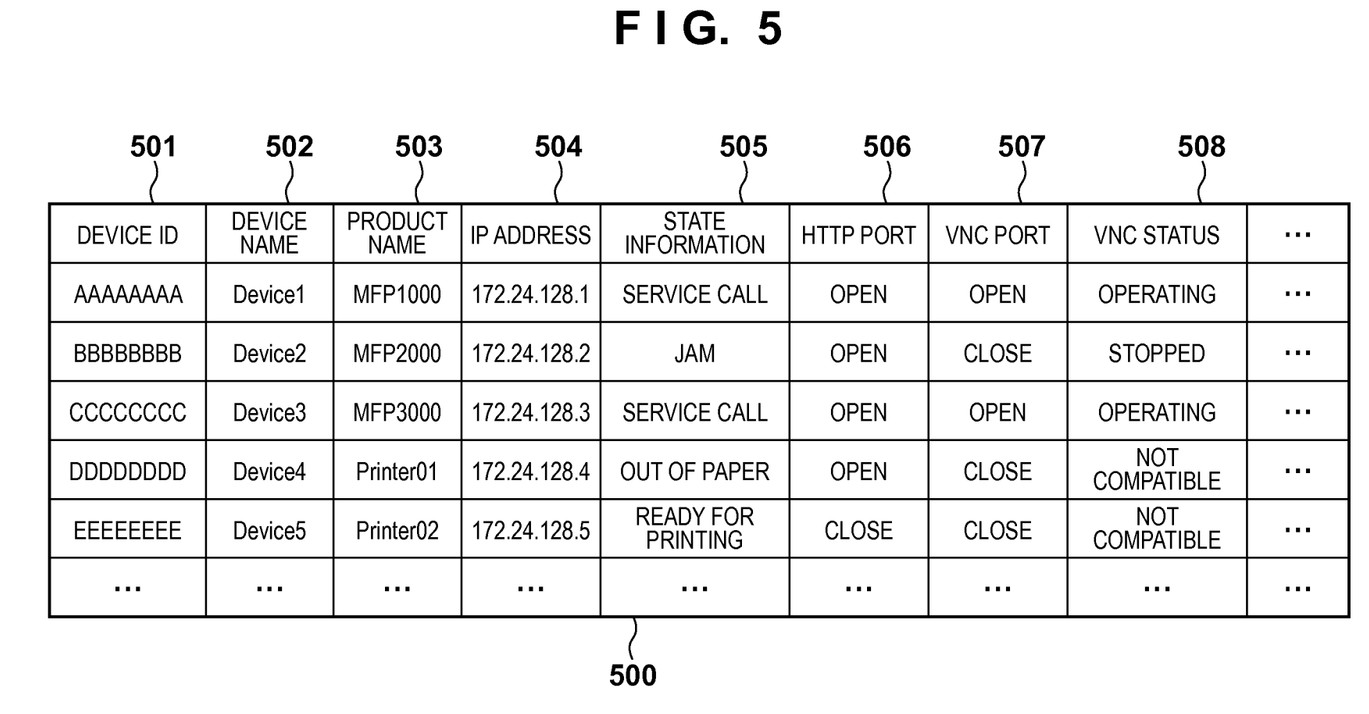
FIG. 5 is a diagram illustrating a configuration of a database that is referenced by the device management program.

FIG. 5 is a diagram illustrating an example of management target device information that is stored in the database 306 of the device management program 300 in the present embodiment. The device management program 300 references the information at the time of execution, and realizes functions of present embodiment.

Information on the management target multifunction devices is stored in a data table 500. A device ID column 501 stores arbitrary identifiers that are assigned to the multifunction devices found by a device searching unit 304. A device name column 502 stores device names, which are user friendly names of the multifunction devices found by the device searching unit 304. Note that the information that is stored in the device name column 502 is obtained by the device management program 300 from SysName, which is an MIB object held by the SNMP agents 320, 330, and 340 of the multifunction devices, or the like.

A product name column 503 stores product names of the multifunction devices found by a device searching unit 304. Note that the information that is stored in the product name column 503 is obtained by the device management program 300 from SysDescr, which is an MIB object held by the SNMP agents 320, 330, and 340 of the multifunction devices, or the like.

An IP address column 504 stores IP addresses of the multifunction devices found by a device searching unit 304. A state information column 505 stores state information on the multifunction devices found by the device searching unit 304. Note that the information stored in the state information column 505 is obtained by the device management program 300 from hrPrinterDetectedErrorState, which is an MIB object held by the SNMP agents of the multifunction devices. Also, it is assumed that vendor-specific detailed error information can be obtained by a vendor-specific MIB.

An HTTP port column 506 stores HTTP port flags whose values are set in steps S405 and S406 of the flowchart of FIG. 4. A VNC port column 507 stores VNC port flags whose values are set in steps S409 and S410 of the flowchart of FIG. 4. A VNC status column 508 stores status information of VNC. In the multifunction device of the present embodiment, it is assumed that the VNC has three types of status information "operating", "stopped", and "not compatible". Note that it is assumed that the multifunction device whose VNC status is "stopped" is a multifunction device whose status can be switched to "operating" by a command of the device management program.

Display Screen of Multifunction Device List

Figure 6A:
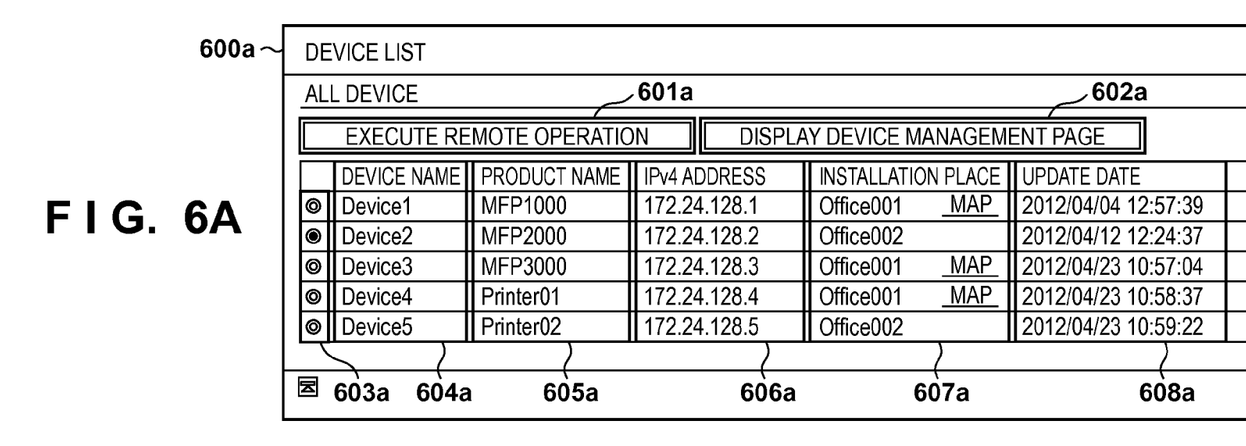
FIGS. 6A and 6B are diagrams each illustrating an image of a device list displayed by the device management program.
Figure 6B:
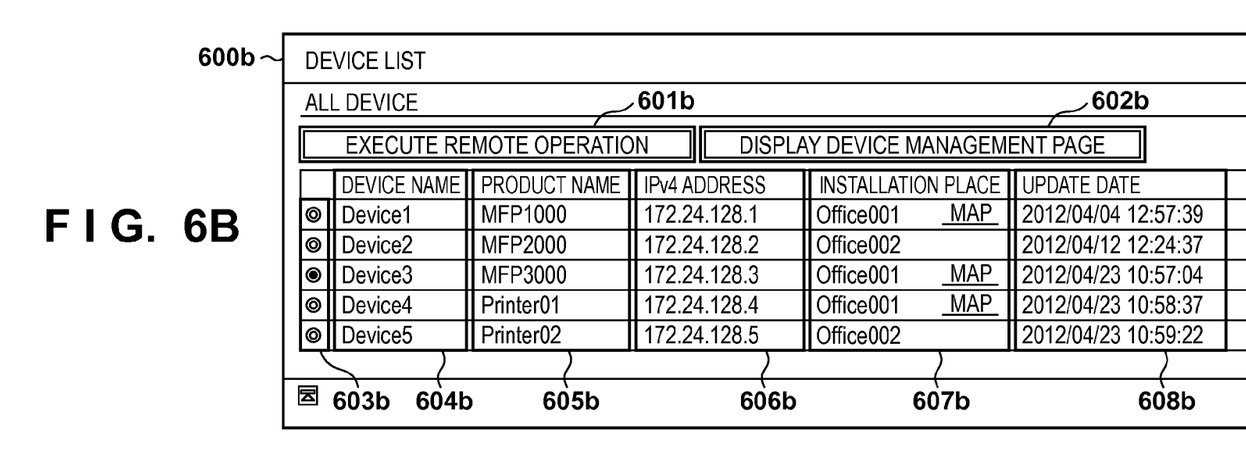

FIGS. 6A and 6B are diagrams each illustrating an image of a display screen of a list (hereinafter referred to as a device list) of multifunction devices that is displayed by the device management program 300. This display screen is provided as data described in, for example, HTML to the WWW browser 350 by the WWW server 301, and is displayed there.

A device list 600a of FIG. 6A illustrates an image of a device whose HTTP port column 506 in a database 500 is open and whose VNC port column 507 is closed. On the other hand, a device list 600b of FIG. 6B illustrates an image of a device whose HTTP port column 506 and VNC port column 507 in the database 500 are both open. Either the device list 600a or the device list 600b is selectively displayed depending on the value of the VNC port column 507 of the device that is selected using a later-described radio button. For example, in the device list 600a, the device 2 whose VNC port column 507 is closed is selected, and in the device list 600b, the device 3 whose VNC port column 507 is open is selected. For example, in the device list 600a of FIG. 6A, if the user selects the device 3, display will change to the device list 600b of FIG. 6B. Note that the switching of the display between FIG. 6A and FIG. 6B is made by a button or a radio button being operated on the WWW browser 350 of the client PC, contents of the operation being transmitted to the device management program 300 via HTTP, and data that corresponds to the operation being provided to the browser from the device management program 300 to update the display. These are procedures that correspond to the general WWW system.

Device name display regions 604a and 604b are regions in each of which the information of the device name column 502 in the database 500 is displayed. Product name display regions 605a and 605b are regions in each of which the information of the product name column 503 in the database 500 is displayed. IP address display regions 606a and 606b are regions in each of which the information of the IP address column 504 in the database 500 is displayed. Installation place display regions 607a and 607b are regions in each of which installation place information where the multifunction devices are installed is displayed. Note that it is assumed that the device management program 300 implements a device map function, in addition to the device lists 600a and 600b shown in FIGS. 6A and 6B, although a description of the device map function is omitted in the present embodiment. Device map function refers to a function in which icons that indicate multifunction devices are arranged in a floor plan of an office, and thus a user can easily recognize where the multifunction devices are arranged. The installation place display regions 607a and 607b each provide links of the multifunction devices that have been registered in the device map, so as to enable the respective device lists to easily be displayed from the device lists 600a and 600b. Radio buttons 603a and 603b are each a radio button that is used for selecting one of the multifunction devices displayed on the corresponding device list 600a or 600b.

When a multifunction device is selected using each of the radio buttons 603a and 603b, the device management program 300 references the HTTP port column 506 and the VNC port column 507 of the selected device. The device management program 300 displays, according to the states of the referenced ports, VNC Viewer start buttons 601a and 601b, and web device management page display buttons 602a and 602b. Note that the start buttons 601a and 601b are regions each used for a click (or pressing) operation, and if the VNC Viewer start button 601b in an enabled state is pressed, the VNC Viewer is then installed into the client PC 150 using the above-described technology such as ClickOnce (registered trademark) and starts. Also, in the environment in which the VNC Viewer has already been installed, the VNC Viewer is merely started.

Further, in the present embodiment, when the VNC port of the selected device is closed, the VNC Viewer start button is displayed in a disabled state. Therefore, reference numeral 601a denotes display of the button in the case where the VNC port is closed.

Device List Operation Procedure

Figure 7:
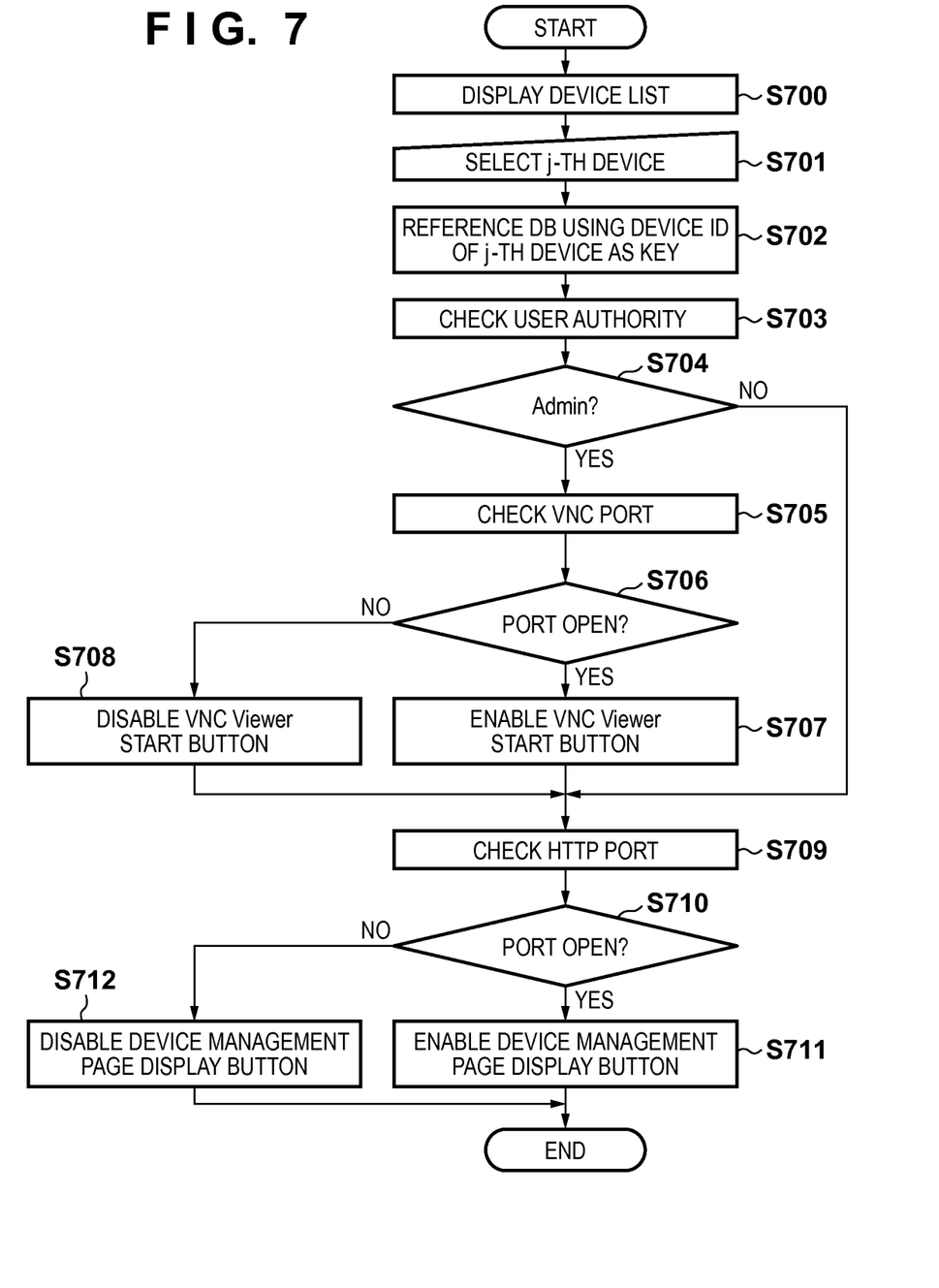
FIG. 7 is a flowchart illustrating operations performed when a user of the device management program operates the device list.

FIG. 7 is a flowchart illustrating operations when a user of the device management program 300 according to the embodiment of the present invention operates a list (hereinafter referred to as a device list) of the management target multifunction devices. Note that the term "display" used in the following description means that the device management program 300 provides a web page of the device list in response to a client request, and the browser 350 of the client displays the web page.

In FIG. 7, in step S700, the device management program 300 displays the device list 600a or 600b, and the procedure shifts to step S701. In step S701, the j-th device is selected by the corresponding radio button 603a or 603b, and the procedure shifts to step S702. In step S702, the database 500 is referenced using the device ID of the selected j-th device as a key, and the procedure shifts to step S703. In step S703, user authority of the device management program 300 is checked (referenced), and the procedure shifts to step S704. Note that it is assumed that the device management program 300 designates, when generating a user account, an administrator authority and a general user authority, although a description thereof is omitted in the present embodiment. Also, the device management program 300 performs control so as to permit a user who has an administrator authority to change settings of the multifunction device but to permit a user who has a general user authority only to display information. In step S704, it is determined whether or not the user authority referenced in step S703 is an administrator authority. As a result of the determination, if the user of the device management program 300 has an administrator authority, the procedure shifts to step S705, and otherwise the procedure shifts to step S709. In the present embodiment, therefore, the VNC Viewer start buttons 601a and 601b are not displayed to users other than the user who has an administrator authority.

In step S705, the VNC port column 507 in the database 500 is checked (referenced) using the device ID of the j-th multifunction device as a key, and the procedure shifts to step S706. In step S706, it is determined whether or not the VNC port of the j-th multifunction device reference in step S705 is open, and if the VNC port is open, the procedure shifts to step S707, and otherwise the procedure shifts to step S708. In step S707, as a result of the determination in step S706 showing that the VNC port of the j-th multifunction device is open, a button for starting the VNC Viewer is displayed in an enabled state (601b), and the procedure shifts to step S709. In step S708, as a result of the determination in step S706 showing that the VNC port of the j-th multifunction device is closed, the button for starting the VNC Viewer is displayed in a disabled state (601a), and the procedure shifts to step S709.

In step S709, the HTTP port column 506 in the database 500 is checked (referenced) using the device ID of the j-th multifunction device as a key, and the procedure shifts to step S710. In step S710, it is determined whether or not the HTTP port of the j-th multifunction device referenced in step S705 is open. If the result of the determination in step S710 shows that the HTTP port is open, the procedure shifts to step S711, and otherwise the procedure shifts to step S712. In step S711, as a result of the determination showing that the HTTP port of the j-th multifunction device is open, a button for displaying the web device management page is displayed in an enabled state (602a, 602b), and the procedure ends. In step S712, as a result of the determination showing that the HTTP port of the j-th multifunction device is closed, the button for displaying the web device management page is displayed in a disabled state (not shown), and the procedure ends.

With the above-described procedures, in the device management program 300 according to the present embodiment, it is possible to determine the operational status of the remote operation server application in the multifunction device and to effectively start the remote operation server application.

If the device list 600a of FIG. 6A, for example, is displayed on the client PC 150 by the web browser program 350, the user can click the button 602a. Accordingly, the displayed web page is redirected to the device management page 333 of the selected device 2 and the device management page 333 is displayed. This is a screen such as illustrated in FIG. 11C.

Also, if the device list 600b of FIG. 6B, for example, is displayed on the client PC 150 by the web browser program 350, the user can also click the button 601*b*. In this case, in response to this click, the device management server 110 downloads and installs the remote operation client application 310 into the client PC 150 on which the button 601*b* is operated, and causes the remote operation client application 310 to be executed. Note that if the remote operation client application 310 has already been installed, it is sufficient only to execute the remote operation client application 310. Accordingly, the remote operation client application 310 that is executed on the client PC 150 requests the screen data that is to be displayed from the remote operation server applications 324 and 344 by predetermined procedures, and receives and displays the requested image data. This is the screen illustrated in FIG. 11B as an example.

Figure 11A:
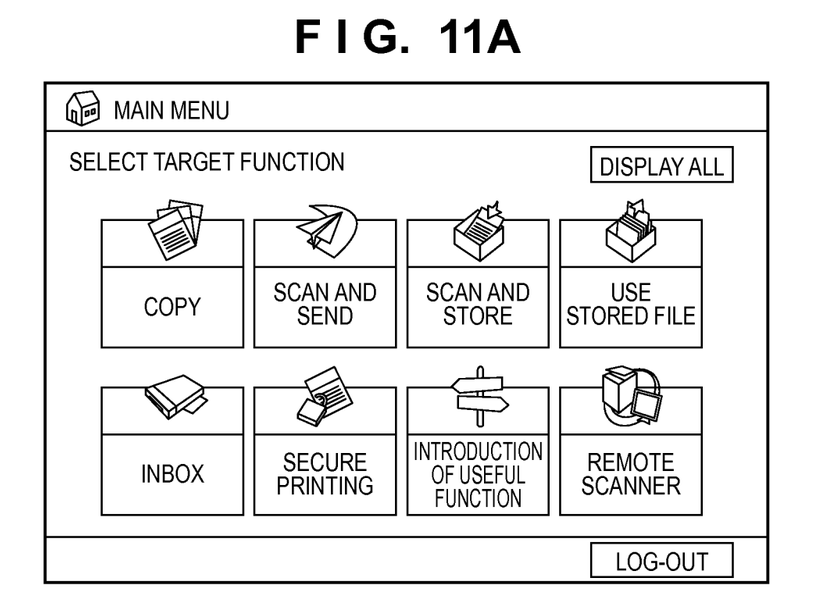
FIGS. 11A, 11B, and 11C are diagrams illustrating images of an operation unit, a remote operation server application, and a device management page of the multifunction device.
Figure 11B:
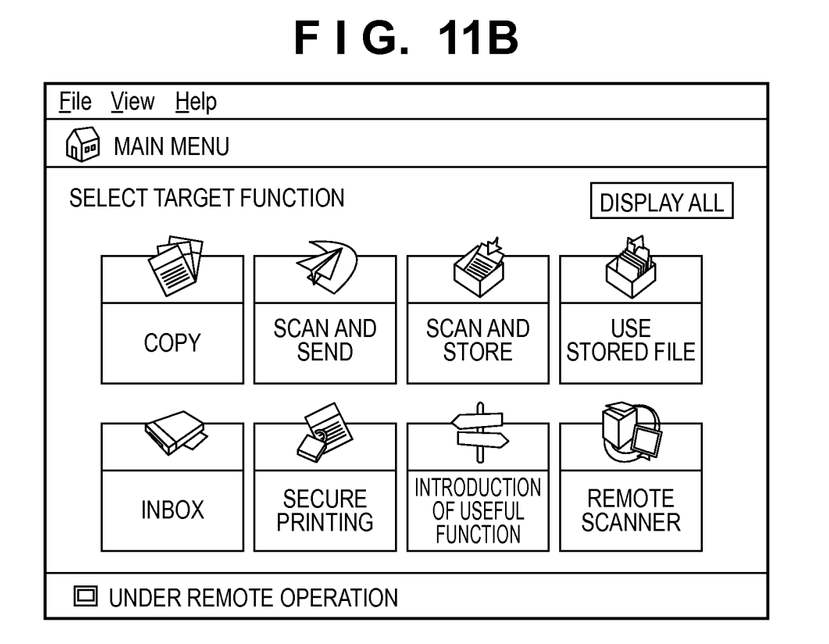
Figure 11C:
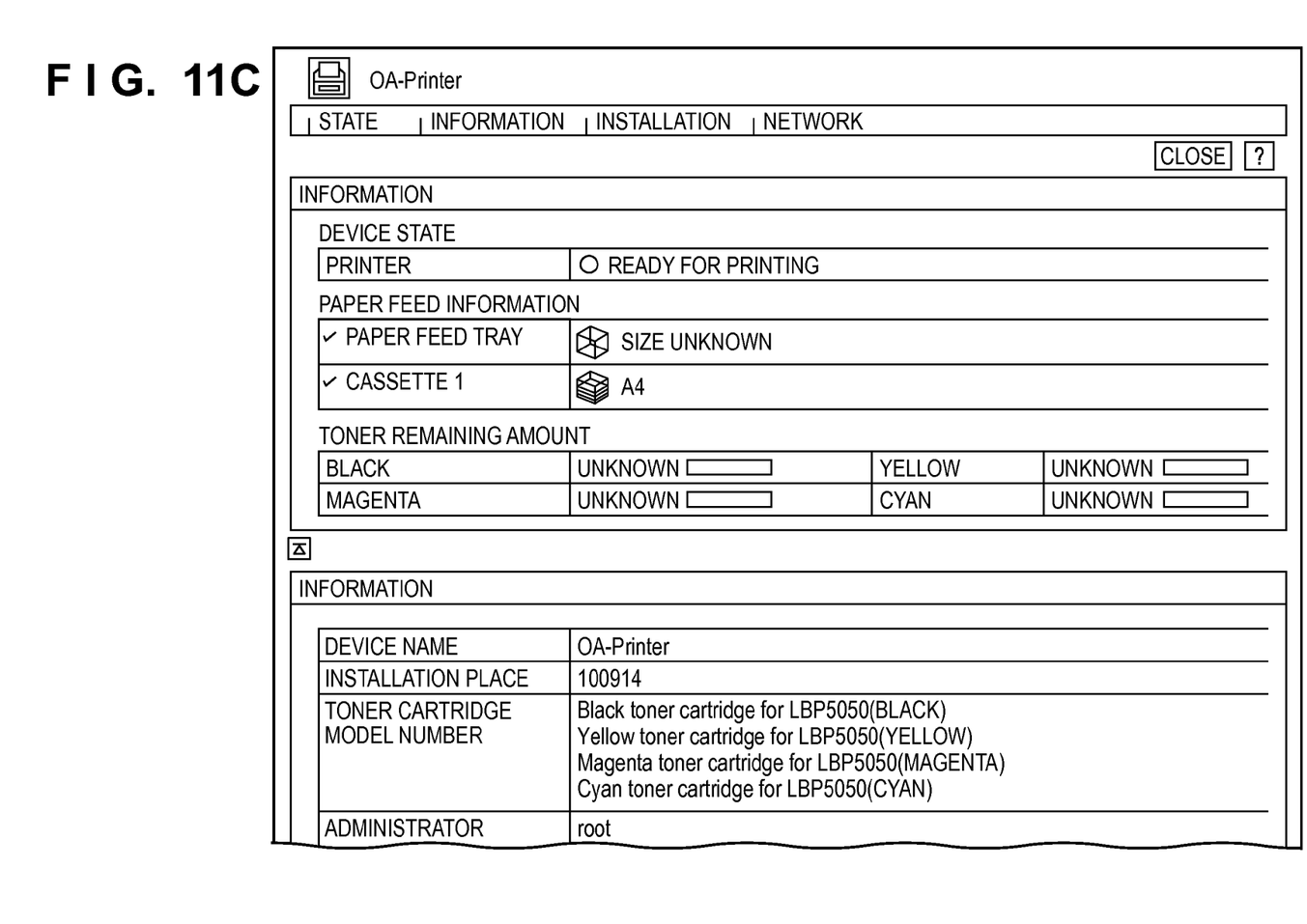

FIGS. 11A, 11B, and 11C are diagrams illustrating images of an operation unit 1016, a remote operation server application 324 or 344, and a device management page 323, 333, or 343 of the multifunction devices 120, 130, and 140 of the present embodiment. FIG. 11A shows an image of the operation unit 1016, FIG. 11B shows an image of the remote operation server application 324 or 344, and FIG. 11C shows an image of the device management page 323, 333, or 343. As illustrated in FIGS. 11A, 11B, and 11C, the actual operation unit 1016 has substantially the same image as that of an operation unit that is provided to and displayed on the remote operation client application 310 by the remote operation server applications 324 and 344. In contrast, the display image of the device management pages 323, 333, and 343 that are provided to the client by the WWW server and displayed on the browser has a completely different design.

Embodiment 2

Figure 8:
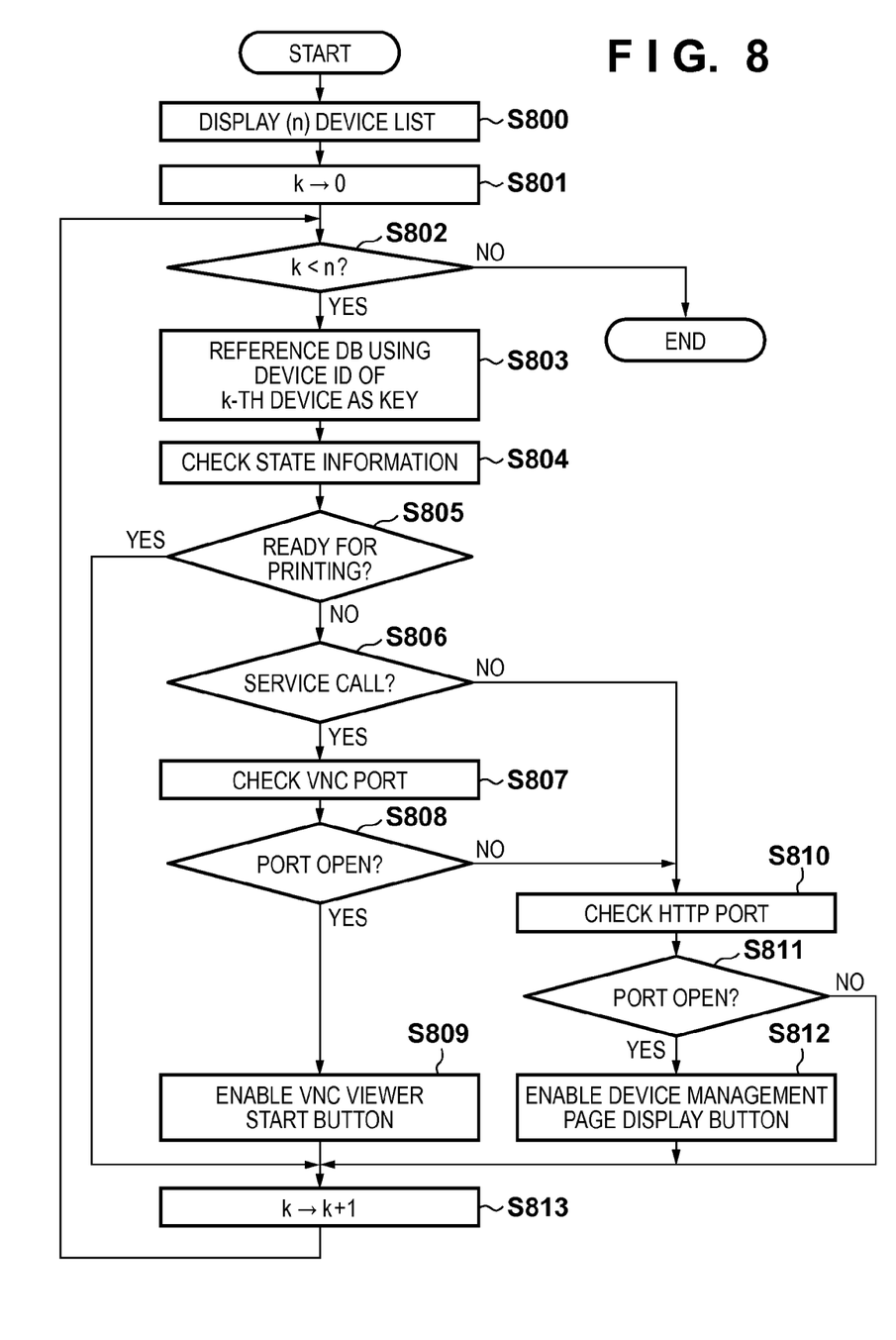
FIG. 8 is a flowchart illustrating operations performed when the device management program displays the device list.

FIG. 8 is a flowchart illustrating operations when the device management program 300 of the present embodiment changes control depending on the states of the management target multifunction devices at the time of displaying a device list. Note that in the present embodiment, differences from Embodiment 1 will be described and a description of the common parts will be omitted.

In FIG. 8, in step S800, the device searching unit 304 starts processing for searching for the multifunction devices via the SNMP control unit 308 and the TCP/IP control unit 309 and detects n devices, and the procedure shifts to step S801. In step S801, the device management program 300 initializes an index k that is used for counting the number of management target multifunction devices to 0, and the procedure shifts to step S802.

In step S802, it is determined whether or not the value of the index k exceeds n, which is the sum total of the found devices, and if the value of the index k does not exceed n, the procedure shifts to step S803, and otherwise the procedure ends. In step S803, the database 500 is referenced using the device ID of the focused k-th device as a key, and the procedure shifts to step S804. In step S804, the state information column 505 in the database 500 is checked using the device ID of the k-th multifunction device as a key, and then the procedure shifts to step S805. In step S805, as a result of the check in step S804, it is determined whether the k-th multifunction device has not malfunctioned and is ready for printing. As a result of the determination in step S805, if the k-th multifunction device is ready for printing, the procedure shifts to step S813, and otherwise the procedure shifts to step S806.

In step S806, as a result of the determination in step S805 showing that the k-th multifunction device is not ready for printing, it is determined whether or not a serious error (hereinafter referred to as a service call error) has occurred in the k-th multifunction device. If it is determined in step S806 that a service call error has occurred in the k-th multifunction device, the procedure shifts to step S807, and otherwise the procedure shifts to step S810.

In step S807, the VNC port column 507 in the database 500 is checked using the device ID of the k-th multifunction device as a key, and the procedure shifts to step S808. In step S808, as a result of the check in step S807, it is determined whether or not the VNC port of the k-th multifunction device is open, and if the VNC port is open, the procedure shifts to step S809, and otherwise the procedure shifts to step S810. In step S809, the VNC Viewer start button is displayed in response to entry of the k-th multifunction device into the device list, and the procedure shifts to step S813.

In step S810, the HTTP port column 506 in the database 500 is checked using the device ID of the k-th multifunction device as a key, and the procedure shifts to step S811. In step S811, as a result of the check in step S810, it is determined whether or not the HTTP port of the k-th multifunction device is open. If it is determined in step S811 that the HTTP port is open, the procedure shifts to step S812, and otherwise the procedure shifts to step S813. In step S812, the web device management page display button is displayed in response to entry of the k-th multifunction device into the device list, and the procedure shifts to step S813.

In step S813, the device management program 300 increments the index k used for counting the number of the management target multifunction devices, and the procedure returns to step S802.

Figure 9:
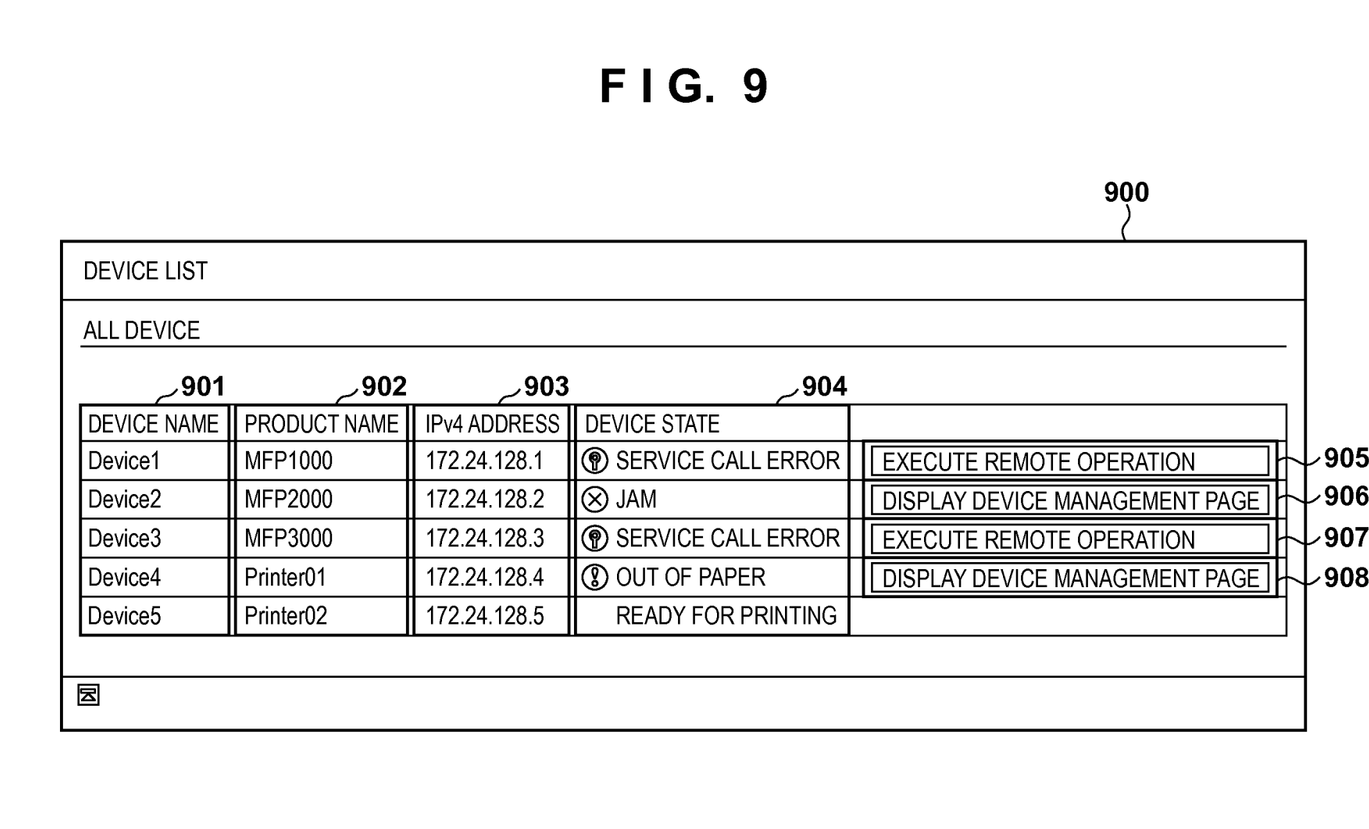
FIG. 9 is a diagram illustrating an image of a device list displayed by the device management program according to Embodiment 2.

FIG. 9 is an image diagram illustrating an example of a device list that the device management program 300 displays by the processing illustrated in the flowchart of FIG. 8. In FIG. 9, a device name display region 901 is a display region where information of the device name column 502 in the database 500 is displayed. A product name display region 902 is a display region where information of the product name column 503 in the database 500 is displayed. An IP address display region 903 is a display region where information of the IP address column 504 in the database 500 is displayed. A state information display region 904 is a display region where information of the state information column 505 in the database 500 is displayed. Buttons 905 and 907 are VNC Viewer start buttons that have the same function as that of the above-described button 601*b*. Buttons 906 and 908 are web device management page display buttons that have the same function as those of the above-described buttons 602*a* and 602*b*.

As described above, according to the present embodiment, if a serious error such as a service call error has occurred, it is possible to start VNC that can display and set more detailed information, enabling a dramatic improvement in the operability of device management.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176376, filed Aug. 8, 2012, which is hereby incorporated by reference herein in its entirety.

What is claimed is:

1. A device management apparatus that manages a network device connected to a network, comprising:
   a providing unit configured to provide information to a client terminal connected to the network, the information being provided for displaying a list of a plurality of network devices, a first button corresponding to a first function for accessing a web service provided by a network device and a second button corresponding to a second function for remotely operating a network device;
   a first determination unit configured to determine whether or not a first port of a network device selected from the list displayed in the client terminal is open, the first port being for accessing a web service provided by the selected network device; and
   a second determination unit configured to determine whether or not a second port of the selected network device is open, the second port that being used in communication by an application for remotely operating the selected network device,
   wherein the providing unit is further configured to provide, during a period of time in which the selected network device is being selected from the list, (a) information for enabling the first button if the first port is determined to be open and enabling the second button if the second port is determined to be open, and (b) information for disabling the first button if the first port is determined not to be open and activating the second button if the second port is determined to be open.

2. The device management apparatus according to claim 1, wherein if use of the function for remotely operating the network device is instructed by a user, a remote operation is provided by a client application for remotely operating the network device being executed in a client terminal connected to the network, and communicating with a server application that is executed in the network device.

3. The device management apparatus according to claim 1, wherein the second function for remotely operating the network device is not enabled if it is determined that a user does not have an administrator authority.

4. The device management apparatus according to claim 1, wherein the second port is at least one of ports 5900 to 5906 that are assigned to VNC.

5. The device management apparatus according to claim 1, further comprising a third determination unit configured to determine whether the network device is not ready for printing and a service call has occurred, and
   wherein the second determination unit is further configured to determine, if the third determination unit has determined that the network device is not ready for printing and a service call has occurred, whether or not the second port is open.

6. The device management apparatus according to claim 1, wherein the network device includes an operation unit configured for receiving an operation for using the functions that are provided by the network device and/or referencing information,
   the application for remotely operating the network device causes a client terminal connected to the network to display the same operation screen as an operation screen of the operation unit, and
   the client terminal that has accessed a device management page provided by the network device displays a state of the network device.

7. A device management method that is executed by a device management apparatus that manages a network device connected to a network, the method comprising:
   providing information to a client terminal connected to the network, the information being provided for displaying a list of a plurality of network devices, a first button corresponding to a first function for accessing a web service provided by a network device and a second button corresponding to a second function for remotely operating a network device;
   determining whether or not a first port of a network device selected from the list displayed in the client terminal is open, the first port being for accessing a web service provided by the selected network device; and
   determining whether or not a second port of the selected network device is open, the second port being used in communication by an application for remotely operating the selected network device;
   wherein during a period of time in which the selected network device is being selected from the list, (a) information for enabling the first button is provided if the first port is determined to be open and enabling the second button if the second port is determined to be open, and (b) information for disabling the first button is provided if the first port is determined not to be open and activating the second button if the second port is determined to be open.

8. A non-transitory computer readable medium storing a program for causing a computer to execute a device management method for managing a network device connected to a network, the method comprising:
   providing information to a client terminal connected to the network, the information being provided for displaying a list of a plurality of network devices, a first button corresponding to a first function for accessing a web service provided by a network device and a second button corresponding to a second function for remotely operating a network device;
   determining whether or not a first port of a network device selected from the list displayed in the client terminal is open, the first port being for accessing a web service provided by the selected network device; and
   determining whether or not a second port of the selected network device is open, the second port being used in communication by an application for remotely operating the selected network device;
   wherein during a period of time in which the selected network device is being selected from the list, (a) information for enabling the first button is provided if the first port is determined to be open and enabling the second button if the second port is determined to be open, and (b) information for disabling the first button is provided if the first port is determined not to be open and activating the second button if the second port is determined to be open.

* * * * *